United States Patent
Satou et al.

(10) Patent No.: US 10,571,890 B2
(45) Date of Patent: Feb. 25, 2020

(54) DIAGNOSTIC DATA ACQUISITION SYSTEM, DIAGNOSTIC SYSTEM, AND COMPUTER READABLE MEDIUM

(71) Applicant: FANUC CORPORATION, Yamanashi (JP)

(72) Inventors: Kazuhiro Satou, Yamanashi (JP); Kazunori Iijima, Yamanashi (JP); Yohei Kamiya, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 121 days.

(21) Appl. No.: 15/883,459

(22) Filed: Jan. 30, 2018

(65) Prior Publication Data
US 2018/0231956 A1    Aug. 16, 2018

(30) Foreign Application Priority Data
Feb. 13, 2017 (JP) ................. 2017-023989

(51) Int. Cl.
*G05B 19/00* (2006.01)
*G05B 19/4065* (2006.01)

(52) U.S. Cl.
CPC ........... *G05B 19/4065* (2013.01); *G05B 2219/33285* (2013.01); *G05B 2219/37347* (2013.01)

(58) Field of Classification Search
None
See application file for complete search history.

(56) References Cited

U.S. PATENT DOCUMENTS

| 5,414,632 A * | 5/1995 | Mochizuki ........... G05B 19/406 700/174 |
| 2015/0293523 A1 | 10/2015 | Yamamoto et al. |
| 2016/0091393 A1* | 3/2016 | Liao ................... B23Q 17/0995 702/34 |
| 2017/0115655 A1* | 4/2017 | Chiu ................... G05B 19/4065 |

FOREIGN PATENT DOCUMENTS

| JP | 2015-036675 | 2/2015 |
| JP | 2015-203646 | 11/2015 |
| WO | 2014/167636 | 10/2014 |

OTHER PUBLICATIONS

Office Action dated Sep. 25, 2018 in Japanese Patent Application No. 2017-23989.
Notification of Reasons for Refusal dated Feb. 19, 2019 in Japanese Patent Application No. 2017-023989.

* cited by examiner

*Primary Examiner* — Paul B Yanchus, III
(74) *Attorney, Agent, or Firm* — Wenderoth, Lind & Ponack, L.L.P.

(57) ABSTRACT

Upon performing diagnosis of a machine tool, etc., data suited to diagnosis is acquired while also reducing the burden on the user. A diagnostic data acquisition system that acquires diagnostic data for diagnosing a machine tool includes: a control unit that controls driving of a mobile part of the machine tool based on control data; a timing generation unit that generates an acquisition timing for the diagnostic data based on the control data; and a diagnostic data acquisition unit that acquires data which varies accompanying driving of the mobile part according to control by the control unit, as the diagnostic data.

8 Claims, 5 Drawing Sheets

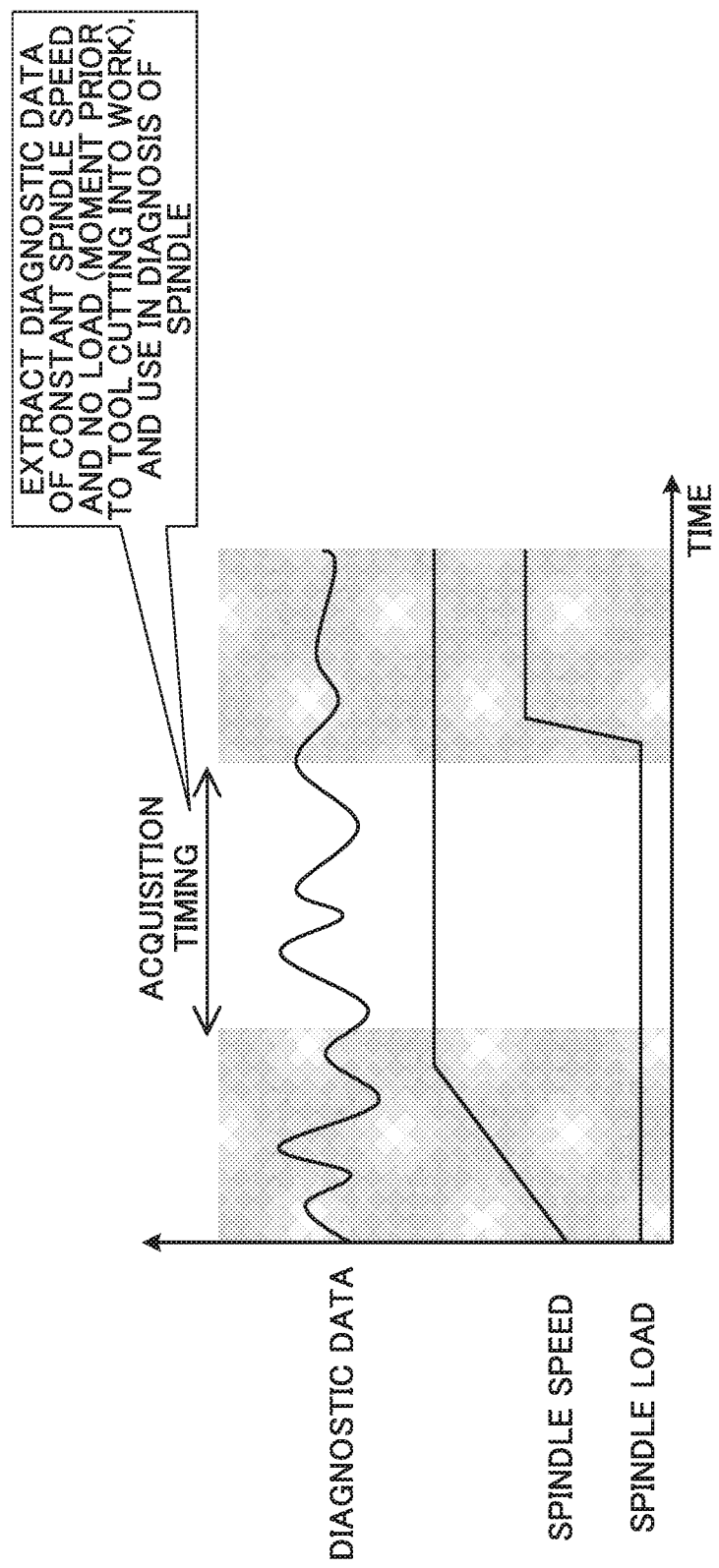

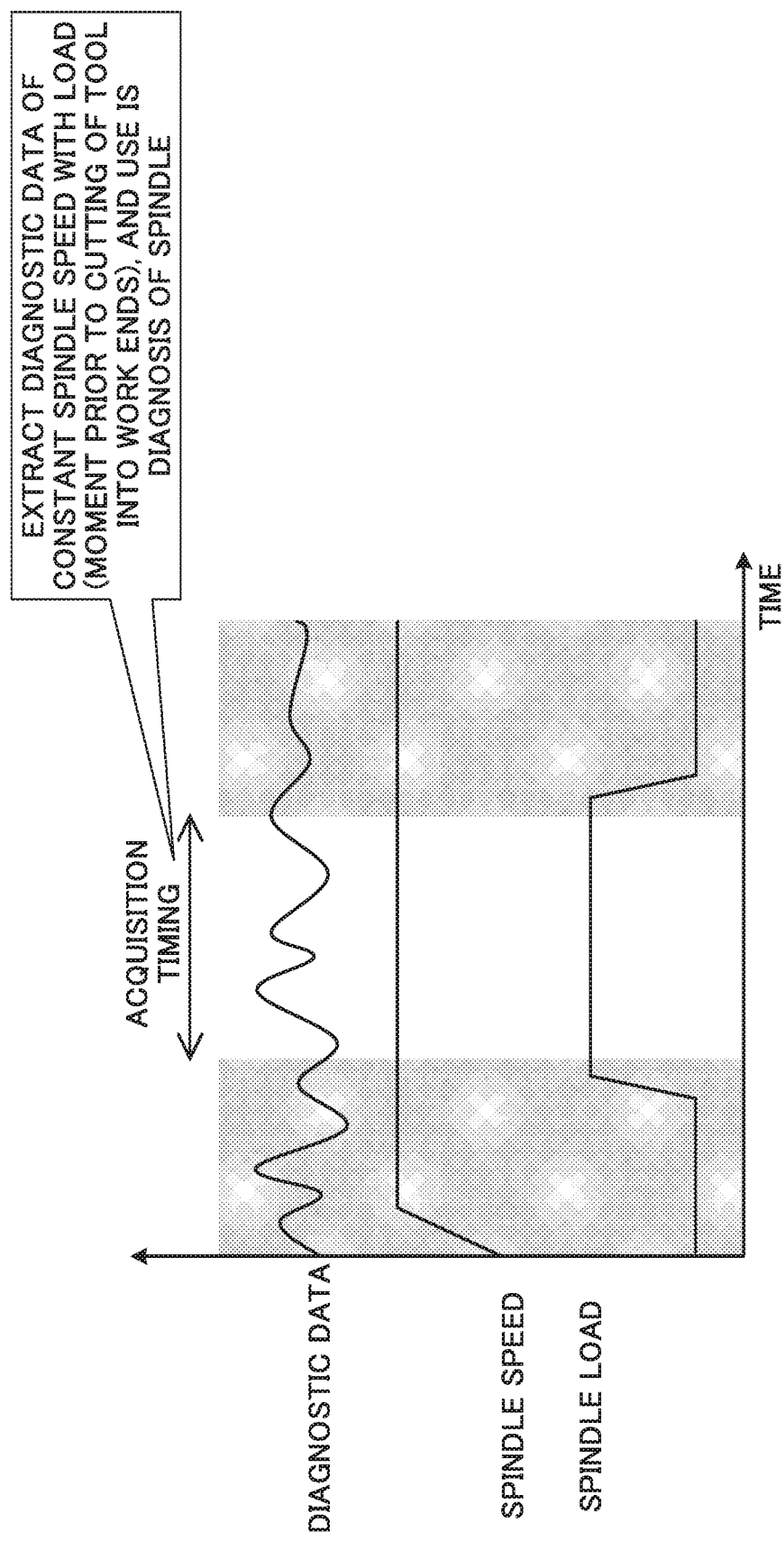

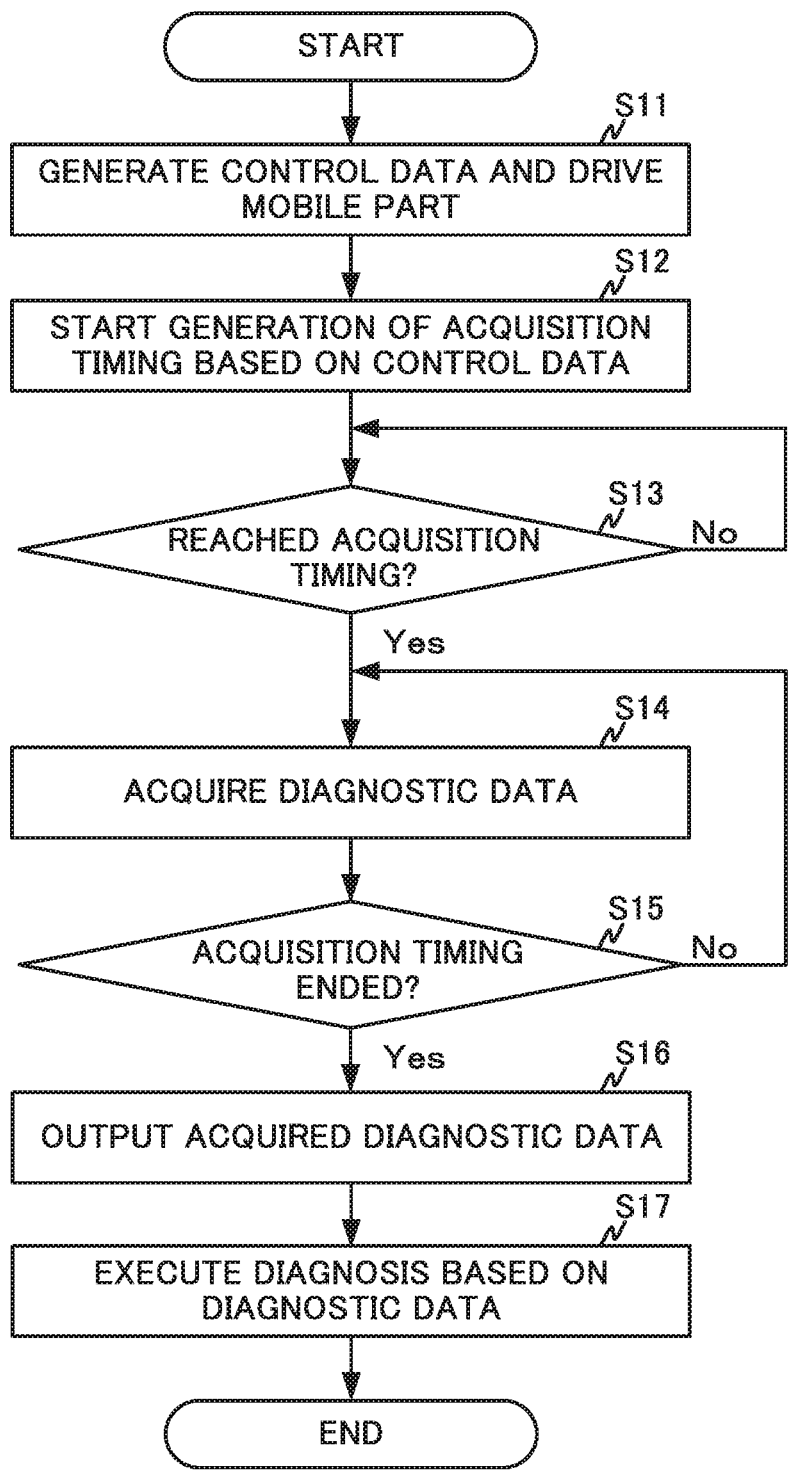

DIAGNOSTIC DATA ACQUISITION SYSTEM, DIAGNOSTIC SYSTEM, AND COMPUTER READABLE MEDIUM

This application is based on and claims the benefit of priority from Japanese Patent Application No. 2017-023989, filed on 13 Feb. 2017, the content of which is incorporated herein by reference.

BACKGROUND OF THE INVENTION

Field of the Invention

The present invention relates to a diagnostic data acquisition system, a diagnostic system and a computer readable medium for performing diagnosis of equipment such as machine tools.

Related Art

In the case of a machine tool failing, it is necessary to perform repair work such. as temporarily stopping operation of the machine tool, and repairing the location of faults, or replacing failed components. However, in the case of a failure occurring at an unexpected timing, it may require time until recovery, and the stop time of the machine tool (downtime) may lengthen. In order to prevent such a situation, it has become important to discover the symptoms of failure or occurrence of failure at an early stage by performing diagnosis such as failure prediction or failure detection from a normal period.

Herein, as a method of performing diagnosis of a machine tool, there is a method of continuously collecting data under as similar conditions as possible, and obtaining knowledge from the time course of collected data. In order to collect data under the same conditions, it is sufficient to conduct predetermined test running in which the revolution speed, etc. of the spindle is defined, for example, at fixed periods (e.g., once every day, etc.).

One example of technology for performing diagnosis by performing such test running is disclosed in Patent Document 1. With the technology disclosed in Patent Document 1, diagnosis is performed using a support vector machine method, which is one technique of supervised machine learning.

More specifically, the initial measured data is acquired by measuring a plurality of parameters of a machine tool, while causing the machine tool to operate in a predetermined operation pattern for testing. In addition, a normal region in the mapping space of support vector machine is generated by using the acquired initial measured data as training data for machine learning.

Then, diagnosis is performed using the normal region of the mapping space of support vector machine generated in this way. More specifically, re-measured data is acquired by measuring a plurality of parameters, while causing the machine tool to operate in a predetermined operation pattern for re-testing. In addition, it is determined whether test data falls into the normal region of the mapping space, using the acquired re-measured data as the test data for machine learning. Based on this determination result, it is possible to perform diagnosis of the machine tool.

Patent Document 1: Japanese Unexamined Patent Application, Publication No. 2015-203646

SUMMARY OF THE INVENTION

After installing and operating the machine tool in a factory or the like, it is possible to perform diagnosis of the machine tool by causing test running to be performed. in the machine tool at fixed periods and acquire test data, as in the aforementioned technology disclosed in Patent Document 1.

However, in order to perform diagnosis in this way, it is necessary for the user to issue an instruction to the machine tool so as to perform test. running. Then, the diagnosis in the aforementioned way requires to continue performing periodically at a frequency of once every day, for example. For this reason, the burden on the user becomes large. In addition, in order to perform test running, since it is necessary to temporarily stop the normal operating by the machine tool, the productivity of the machine tool will decline.

Taking consideration of these problems, it has been considered to also perform diagnosis according to data during normal operating by the machine tool. However, the operation pattern during usual operation is not a pattern aimed at diagnosis, and even if simply acquiring data, this will not necessarily be data appropriate for diagnosis.

Therefore, the present invention has an object of providing a diagnostic data acquisition system, diagnostic system, and diagnostic data acquisition program which acquire data suited to diagnosis, while also reducing the burden on the user, upon performing diagnosis of a machine tool or the like.

A diagnostic data acquisition system (e.g., the diagnostic data acquisition device 200 or diagnostic data acquisition device 201 described later) according to a first aspect of the present invention is a diagnostic data acquisition device that acquires diagnostic data for diagnosing a machine tool (e.g., the machine tool 100 described later), the system including: a control unit (e.g., the control unit 210 described later) that controls driving of a mobile part (e.g., the mobile part 110 described later) of the machine tool based on control data; a timing generation unit (e.g., the timing generation unit 220 described later) that generates an acquisition timing for the diagnostic data based on the control data; and a diagnostic data acquisition unit (e.g., the diagnostic data acquisition unit 230 or diagnostic data acquisition unit 231 described later) that acquires data, which varies accompanying driving of the mobile part by way of control of the control unit, based on the acquisition timing as the diagnostic data.

According to a second aspect of the present invention, in the diagnostic data acquisition system as described in the first aspect, a feedback signal acquired from the machine tool for controlling driving of the mobile part by way of feedback control may be included in the control data; the timing generation unit may generate the acquisition time for the diagnostic data based on at least one predetermined feedback signal; and the diagnostic data acquisition unit may acquire the at least one predetermined feedback signal as the diagnostic data.

According to a third aspect of the present invention, the diagnostic data acquisition system as described in the first or second aspect may further include: a measured data acquisition unit (e.g., the sensor data acquisition unit 240 described later) that acquires, from a measurement unit (e.g., the sensor 120 described later), measured data which was measured by the measurement unit that measures a state related to driving of the mobile part, in which the diagnostic data acquisition unit acquires at least the measured data as the diagnostic data.

According to a fourth aspect of the present invention, in the diagnostic data acquisition system as described in any one of the first to third aspects, the timing generation unit may generate the acquisition timing based also on the measured data acquired by the measured data acquisition unit, in addition to the control data.

According to a fifth aspect of the present invention, in the diagnostic data acquisition system as described in any one of the first to fourth aspects, the timing generation unit may generate the acquisition timing, so that acquisition of the diagnostic data is started in a case of a driving speed of the mobile part becoming a constant speed, and acquisition of the diagnostic data is ended in a case of a load on the mobile part rising or declining more than a predetermined reference.

According to a sixth aspect of the present invention, in the diagnostic data acquisition system as described in the fifth aspect, the timing generation unit may calculate the speed of the mobile part and the load on the mobile part based on the control data.

A diagnostic system according to a seventh aspect of the present invention (e.g., the diagnostic system 1 or diagnostic system 2 described later) includes: the diagnostic data acquisition system as described in any one of the first to sixth aspects; and a diagnostic device (e.g., the diagnostic device 300 described later) that diagnoses the machine tool based on the diagnostic data acquired by the diagnostic data acquisition system.

A diagnostic data acquisition program. according to an eighth aspect of the present invention causes a computer to function as a diagnostic data. acquisition system (e.g., the diagnostic data acquisition device 200 or diagnostic data acquisition device 201 described later) which acquires diagnostic data for diagnosing a machine tool (e.g., the machine tool 100 described later), the diagnostic data acquisition system including: a control unit (e.g., the control unit 210 described later) that controls driving of a mobile part (e.g., the mobile part 110 described later) of the machine tool based on control data; a timing generation unit (e.g., the timing generation unit 220 described later) that generates an acquisition timing for the diagnostic data based on the control data; and a diagnostic data acquisition unit (e.g., the diagnostic data acquisition unit 230 or diagnostic data acquisition unit 231 described later) that acquires data, which varies accompanying driving of the mobile part by way of control of the control unit, based on the acquisition timing as the diagnostic data.

According to the present invention, it becomes possible to acquire data suited. to diagnosis, while also reducing the burden on the user, upon performing diagnosis of a machine tool or the like.

BRIEF DESCRIPTION OF THE DRAWINGS

FIG. 2A is a graph for providing an explanation for an example of acquisition timing in each embodiment of the present invention;

FIG. 2B is a graph for providing an explanation for another example of acquisition timing in each embodiment of the present invention;

FIG. 3 a flowchart representing basic operations of each embodiment of the present invention.

DETAILED DESCRIPTION OF THE INVENTION

First, a summary of an embodiment of the present invention will be explained. The embodiment of the present invention determines the acquisition timing of diagnostic data using general control data for controlling the driving of a mobile part of a machine tool or the like. Then, at the acquisition timing determined in this way, diagnostic data is acquired, and diagnosis is performed according to the acquired diagnostic data. In the embodiment of the present invention, it thereby becomes possible to reduce the burden on the user, since it is possible to conduct diagnosis without performing test running.

In addition, in the embodiment of the present invention, it is configured so that the acquisition timing becomes a timing that can acquire diagnostic data under the same conditions for every event of acquiring diagnostic data. In the embodiment of the present invention, it is thereby possible to acquired data suited to obtaining knowledge from the time course of data in diagnosis.

In other words, in the embodiment of the present invention, it is possible to solve the problem of "acquire data suited to diagnosis while also reducing the burden on the user upon performing diagnosis of a machine tool or the like", stated in the section of (Problem to be Solved by the Invention). The above is a summary of an embodiment of the present invention.

Next, an embodiment of the present invention will be explained in detail by referencing the drawings. Herein, explanations will be provided for a first embodiment, which is a basic embodiment of the present invention, and a second embodiment established by modifying the configuration of the first embodiment.

First Embodiment

Figure 1:
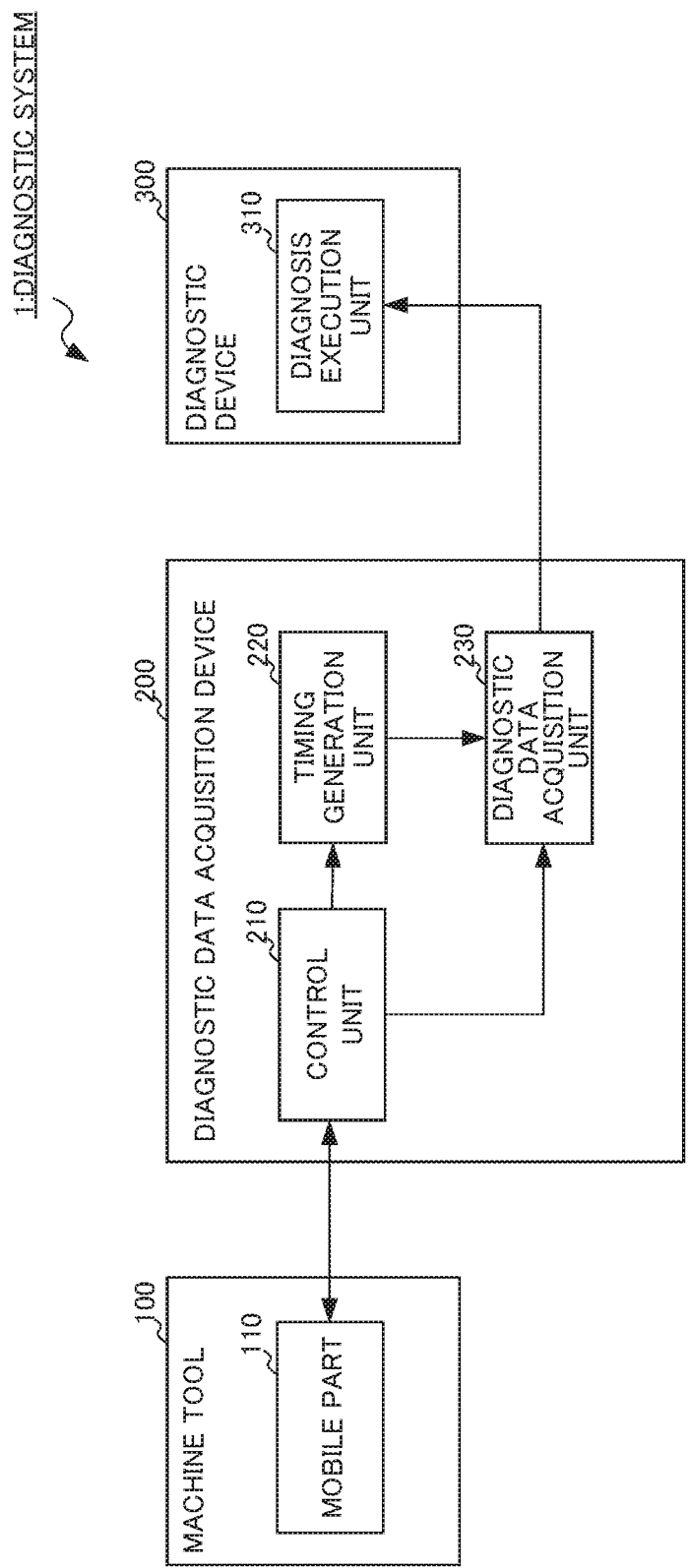
FIG. 1 is a block diagram representing a basic configuration of a first embodiment of the present invention.

FIG. 1 shows the overall configuration of a diagnostic system 1, which is the first embodiment. As shown in FIG. 1, the present embodiment includes a machine tool 100, a diagnostic data acquisition device 200 and a diagnostic device 300. The machine tool 100 is communicably connected with the diagnostic data acquisition device 200. In addition, the diagnostic data acquisition device 200 is communicably connected also with the diagnostic device 300. These connections may be direct connections via a connection interface, or may be connections through a relay device via a network such as a LAN (Local Area Network). It should be noted that, in FIG. 1, the diagnostic data acquisition device 200 is illustrated as a singular device, and an explanation is provided with the diagnostic data acquisition device 200 as a singular device in the following explanation; however, this does not have the aim of limiting the configuration of the present invention. It may be configured so as to realize the diagnostic data acquisition device 200 by way of a system including a plurality of devices, a network connecting this plurality of devices, etc. (corresponding to "diagnostic data acquisition system" of the present invention).

The machine tool 100 is a machine tool that performs predetermined machining such as cutting based on control of a numerical control device or the like. The machine tool 100 includes a mobile part 110. The mobile part 110 includes a motor that drives in order to machine a work, a spindle and/or feed shaft mounted to this motor, a jig or tool corresponding to these respective shafts, etc. The machine tool 100 performs predetermined machining by causing the mobile part 110 to drive based on a operation command outputted from the diagnostic data acquisition device 200. Herein, there is no particular limitation in the contents of the predetermined machining, and other than cutting, it may be other machining such as grinding, polishing, rolling or forging, for example.

It should be noted that the machine tool 100 is not necessarily a tool unique to the present embodiment, and can be realized by way of a common machine tool. In addition, it may not be realized by a machine for machining by numerical control, but rather be configured so as to realize the machine tool 100 by way of other devices, for example a robot that operates within a factory.

The diagnostic data acquisition device 200 has a function of causing the predetermined machining to be performed in the machine tool 100 by way of controlling the machine tool 100. In addition, the diagnostic data acquisition device 200 also has function of acquiring diagnostic data, which is data for diagnosing the machine tool 100.

In order to realize these functions, the diagnostic data acquisition device 200 includes a control unit 210, a timing generation unit 220, and a diagnostic data acquisition unit 230.

The control unit 210 is a portion that realizes functions as a general numerical control device. The control unit 210 controls the driving of the mobile part 110 of the machine tool 100, by generating an operation command including a operation command related to each axis, a spindle rotation command for a spindle motor driving the spindle, etc. based on the control data, and sending the generated operation command to the machine tool 100. The predetermined machining is thereby realized by the machine tool 100.

Herein, the control unit 210 performs feedback control of correcting the operation command generated by the machining program, by way of performing a proportional calculation or integral calculation based on the feedback signal such as a speed feedback signal. For this purpose, the control unit 210 receives the feedback signal which changes accompanying the movement of the mobile part 110 from the machine tool 100. In other words, in addition to information such as the machining program, information related to feedback control such as the speed feedback signal and electric current feedback signal shall also be included in the control data of the present embodiment.

Herein, the speed feedback signal, for example, can be calculated by differentiating a position feedback signal detected by a rotary encoder or linear encoder included in the machine tool 100. In addition, the electric current feedback signal can be detected by measuring the electric current flowing to the motor, for example. It should be noted that feedback control of a machine tool is common technology, and is well-known to those skilled in the art; therefore, a more detailed explanation than this will be omitted.

The timing generation unit 220 is a portion that acquires control data from the control unit 210, and generates an "acquisition timing", which is a timing at which to acquire diagnostic data based on the acquired control data. The timing generation unit 220 acquires an operation command value based on the machining program included in the control data, and a signal value of the speed feedback signal or a signal value of the electric current feedback signal of the spindle motor corresponding to the spindle, for example.

Then, the timing generation unit 220 calculates the information required for generating the acquisition timing. For example, the drive speed for the spindle or feed shaft is calculated based on the operation command value based on the machining program, and the signal value of the speed feedback signal. In addition, the timing generation unit 220 calculates the load torque acting on the spindle based on the signal value of the electric current feedback signal of the spindle motor corresponding to the spindle.

It should be noted that the method of performing calculation in this way is merely one example for obtaining the required information, and it maybe be configured so as to obtain the required information by a method other than calculation by the timing generation unit 220. For example, for the load torque, it may be configured so as to provide a disturbance estimating observer to the spindle control circuit controlling the spindle motor which. corresponds to the spindle, and detect the load torque by this disturbance estimating observer.

In any case, the timing generation unit 220 acquires the information required for generating the acquisition timing, and generates the acquisition timing based on this information. It is configured so that the acquisition timing is a timing at which it is possible to acquire diagnostic data under the same conditions for every event of acquisition of diagnostic data, as mentioned above. Then, the timing generation unit 220 outputs the generation acquisition timing to the diagnostic data acquisition unit 230. It should be noted that the details of the generation method of acquisition timing will be described later by referencing FIGS. 2A and 2B.

The diagnostic data acquisition unit 230 acquires diagnostic data based on the acquisition timing generated by the timing generation unit 220. In the present embodiment, the diagnostic data acquisition unit 230 acquires information used in diagnosis by the diagnostic device 300 as diagnostic data, among the information included in the control data. The data used in diagnosis is decided according to the diagnostic method by the diagnostic device 300. For example, it may be information for calculating the drive speed of the spindle or feed shaft in the same way as the information required for generating the acquisition timing, may be information for calculating the load torque acting on the spindle, or may be other information. The diagnostic data acquisition unit 230 outputs the acquired diagnostic data to the diagnostic device 300.

The diagnostic device 300 is a device that performs diagnosis based on the diagnostic data outputted by the diagnostic data acquisition unit 230. The diagnostic device 300 includes a diagnosis execution unit 310 as a portion for executing diagnosis.

Diagnosis by the diagnosis execution unit 310 is diagnosis for performing failure prediction or failure detection, for example. The diagnostic method may be any method and, for example, may be a simple method of comparing values included in the diagnostic data and predetermined thresholds, and performing diagnosis based on the comparison results. In addition, it may be configured so that the diagnosis execution unit 310 performs diagnosis using machine learning.

For example, it may be configured so that the diagnosis execution unit 310 constructs a learning model by performing machine learning using the diagnostic data as learning data, and performs diagnosis with the this constructed learning model and new diagnostic data. In addition, it may be configured so that the diagnosis execution unit 310 does diagnosis using a learning model constructed by performing learning with another device.

As machine learning, for example, it may be learning by a support vector machine method such as that disclosed in Patent Document 1, or may be another method. For example, it may be configured so as to perform supervised learning by way of a neural network constituted by combining perceptrons. More specifically, training data is created by giving labels to input data (for example, diagnostic data of the present embodiment), and this training data is provided to the neural network.

Then, so that the output of the neural network becomes the same as the label, the weighting for each perceptron included in the neural network is changed. For example, the weighting is changed by repeating the processing of Forward-propagation and Back-propagation.

It may be configured. so as to learn the characteristics of training data, and recursively attain a learning model for estimating a result from inputs. In addition, it may be configured so as to further adopt a technique such as deep learning.

Alternatively, it may be configured so as to perform unsupervised learning. Unsupervised learning differs from supervised learning which learns by giving training data, and is a learning method in which input data is given, but labels are not given. With unsupervised learning, the patterns and characteristics included in input data (for example, the diagnostic data of the present embodiment) is learned and modeled.

For example, in order to perform clustering, a learning model is constructed using an algorithm such as the k-means method or Ward method. Then, using the constructed learning model, clustering is performed to automatically classify the given input data without an external reference. It is thereby possible to perform detection of defects or failures, for example.

In addition, as an intermediate learning method between the aforementioned supervised learning and unsupervised learning, it may be configured to perform semi-supervised learning which uses groups of input data and output data along with only input data.

Furthermore, in the case of realizing the machine tool 100 with a robot, for example, it may be configured so as to perform diagnosis of reduction gears or the like of the robot, using the diagnostic method disclosed in Japanese Unexamined Patent Application, Publication No. 2008-32477, for example.

Using any of the diagnostic methods, the diagnosis execution unit 310 outputs a diagnosis result. As the method of output, for example, it is good to configure so that the diagnosis result is displayed on a display (not illustrated) equipped to the diagnostic device 300 or diagnostic data acquisition device 200. In addition, it may otherwise be configured so as to send the diagnosis result to another device, or record inside of the diagnostic device 300 or in an external recording device. In addition, it may otherwise be configured so as to output an alarm sound in the case such as failure being found as a result of diagnosis, for example.

The functional blocks of the diagnostic data acquisition device 200 and diagnostic device 300 have been explained above. Next, an explanation will be provided for the approach of realization of these functional blocks. In order to realize these functional blocks, each of the diagnostic data acquisition device 200 and diagnostic device 300 includes an arithmetic processing unit such as a CPU (Central Processing Unit). In addition, each of the diagnostic data acquisition device 200 and diagnostic device 300 includes an auxiliary storage device such as a HDD (Hard Disk Drive) storing various control programs such as application software and the OS (Operating System), and a main storage device such as RAM (Random Access Memory) for storing data that is necessitated temporarily upon the arithmetic processing unit executing programs.

Then, in each device, the arithmetic processing unit reads out the application and/or OS from the auxiliary storage device, and performs arithmetic processing based on this application and/or OS, while expanding the read application and/or OS in the main storage device. In addition, based on these computation results, the various hardware possessed by the respective devices is controlled. The functional blocks of the present embodiment are thereby realized. In other words, the present embodiment can be realized by hardware and software cooperating.

As a specific example, the diagnostic data acquisition device 200 can be realized by adding software for realizing the present invention to a numerical control device. In addition, the diagnostic device 300 can be realized by software for realizing the present embodiment in a personal computer.

However, since the computation amount increases accompanying machine learning for the diagnostic device 300, it is preferable to configure so as to install GPUs (Graphics Processing Units) to a personal computer, and use the GPUs in the arithmetic processing accompanying machine learning, according to a technique called GPGPU (General-Purpose computing on Graphics Processing Units). High-speed processing thereby becomes possible. Furthermore, in order to perform higher-speed processing, it may be configured to construct a computer cluster using a plurality of computers equipped with such GPUs, and perform parallel processing with the plurality of computers included in this computer cluster.

Next, an explanation will be made for the approach of acquisition timing in the present embodiment by referencing FIGS. 2A and 2B. It should be noted that, although mentioned above, it is configured so that the acquisition timing becomes a timing at which it is possible to acquire diagnostic data under the same conditions for every event of acquisition or diagnostic data in the present embodiment as a premise.

First, the changes accompanying the time series are shown in FIG. 2A for the spindle speed, spindle load and diagnostic data, respectively. As mentioned above, the timing generation unit 220 acquires the values for the spindle speed and spindle load as the information required in the generation of diagnostic data. In addition, the diagnostic data acquisition unit 230, in a state capable of acquiring diagnostic data, performs acquisition of diagnostic data based on the acquisition timing.

Then, the timing generation unit 220 generates the acquisition timing so as to acquire diagnostic data, in the case of being "spindle speed constant at no load" based on the values for the spindle speed and spindle load. Herein, case of "spindle speed being constant and no load" corresponds to a case of being the moment before the tool mounted to the mobile part 110 cuts into a work.

More specifically, the timing generation unit 220 first monitors the spindle speed. Then, in the case of the speed for the spindle speed becoming constant, when monitoring the spindle load and the spindle load being no load, it becomes the acquisition timing, and the fact that it has become the acquisition timing is notified to the diagnostic data acquisition unit 230. The diagnostic data acquisition unit 230 starts acquisition of diagnostic data in response to this notification.

Herein, in the case of the change in spindle speed being a change smaller than a predetermined threshold over a time longer than a predetermined time, it can be determined that the spindle speed is constant. In addition, in the case of the spindle load being a load smaller than a predetermined threshold, it can be determined that the spindle load is no load.

Subsequently, the timing generation unit 220 continues monitoring of the spindle load, and in the case of the spindle load rising due to the tool cutting into the work, and the spindle load no longer being no load, the acquisition timing is said to have ended, and the fact that the acquisition timing has ended is notified to the diagnostic data acquisition unit 230. The diagnostic data acquisition unit 230 ends acquisition of diagnostic data in response to this notification.

It should be noted that it is good to configure so that the diagnostic data acquisition unit 230 does not output to the diagnostic device 300 all of the diagnostic data acquired up to the moment receiving the notification, but rather outputs to the diagnostic device 300 the diagnostic data acquired up to a predetermined time period before the moment of receiving the notification.

In other words, as illustrated, it is good to set the acquisition timing as up to a predetermined time substantially before the spindle load rises. Diagnostic data which is inappropriate for diagnosis considered to suddenly change at the instant at which the load rises, i.e. instant at which tool cuts into the work, will not be used in diagnosis. If configuring in this way, it becomes possible to acquire diagnostic data under the same conditions of "prior to tool cutting into work", for every event of acquisition of diagnostic data.

Next, an explanation will be made for other methods of generating the acquisition timing by referencing FIG. 2B, FIG. 2B shows the chance accompanying the time series for the spindle speed, spindle load, and diagnostic data, respectively, similarly to FIG. 2A.

Then, the timing generation unit 220 generates the acquisition timing so as to acquire the diagnostic data, in the case of being "spindle speed constant, load constant", based on the values for the spindle speed and spindle load. Herein, case of being "spindle speed constant, load constant" corresponds to a case of being an instant at which the tool mounted to the mobile part 110 cut into the work and then continued machining, and prior to cutting being finished (i.e. instant prior to machining being finished). For example, in the case of the thickness of the work being uniform, it tends to be a state of "spindle speed constant, load constant".

More specifically, the timing generation unit. 220 first monitors the spindle speed. Then, in the case of the speed for the spindle speed becoming constant, when monitoring the spindle load, and the spindle load being a constant load, it is said to have become the acquisition timing, and the fact that it has become the acquisition timing is notified to the diagnostic data acquisition unit 230.

The diagnostic data acquisition unit 230 starts the acquisition of diagnostic data in response to this notification. Herein, the method of determining that the spindle speed is constant is as mentioned above by referencing FIG. 2A. In addition, it is possible to determine that the spindle load is a constant load, in the case of the spindle load becoming a load within a predetermined range.

Subsequently, in the case of continuing monitoring of the spindle load, when the spindle load falls due to cutting of the tool into the work ending, and the spindle load is no longer a constant load, the acquisition timing is said to have ended, and the timing generation unit 220 notifies the fact that acquisition timing has ended to the diagnostic data acquisition unit 230. The diagnostic data acquisition unit 230 ends the acquisition of diagnostic data in response to this notification.

It should be noted that, similarly to the case explained by referencing FIG. 2A, it is good to configure so that the diagnostic data acquisition unit 230 does not output to the diagnostic device 300 all of the diagnostic data acquired up to the moment receiving the notification, but rather outputs to the diagnostic device 300 the diagnostic data acquired up to a predetermined time period before the moment of receiving the notification.

In other words, as illustrated, it is good to set the acquisition timing to substantially up to a predetermined time before the spindle load falls. The diagnostic data inappropriate for diagnosis considered to suddenly change at the instant the load falls, i.e. instant cutting of the tool into the work finishes, is thereby no longer used in diagnosis. If configured in this way, it becomes possible to acquire diagnostic data under the same conditions of "prior to cutting of the tool into the work ends" in every event of acquisition of diagnostic data.

Two methods of generating the acquisition timing have been explained above by referencing FIGS. 2A and 2B. The timing generation unit 220 may be configured to generate the acquisition timing by either of these two generation methods, or may be configured so as to generate the acquisition timing by both methods.

It should be noted that FIG. 2A and FIG. 2B described later are illustrated views for facilitating understanding of the explanation. For example, in the drawings, changes in spindle speed or spindle load are represented by straight lines; however, in practice, since there are micro changes, they change including some curves.

Next, an explanation will be made for operations of the present embodiment referencing the flowchart of FIG. 3. First, the control unit 210 performs driving of the mobile part 110 by generating control data based on the machining program and feedback signal (Step S11).

Next, the timing generation unit 220 starts generation of the acquisition timing based on predetermined information included in the control data (Step S12). The method of generating the acquisition timing is as described above by referencing FIGS. 2A and 2B.

In order to generate the acquisition timing, first, the timing generation unit 220 continues monitoring of the spindle speed or spindle load (NO in Step S13). Then, in the case of reaching the acquisition timing (YES in Step S13), this fact is notified to the diagnostic data acquisition unit 230.

The diagnostic data acquisition unit 230 performs acquisition of the diagnostic data in response to the notification (Step S15). Subsequently, the timing generation unit 220 continues the monitoring of the spindle speed and/or spindle load, and the diagnostic data acquisition unit 230 continues acquisition of diagnostic data (NO in Step S15). Then, in the case of the acquisition timing ending (YES in Step S15), this fact is notified to the diagnostic data acquisition unit 230.

The diagnostic data acquisition unit 230 ends the acquisition of diagnostic data in response to the notification, and outputs the acquired diagnostic data to the diagnosis device 300 (Step S16). In this case, the point in that it may be configured so as to output the diagnostic data acquired up to a predetermined time before the moment of receiving the notification is as described above. It should be noted that the temporal length, although varying according to the environment in which applying the present embodiment; however, is a length less than 1 second, for example.

Then, the diagnosis execution unit 310 of the diagnostic device 300 having accepted the diagnostic data performs diagnosis based on this diagnostic data.

According to the present embodiment explained above, since it is possible to execute diagnosis without separately performing test running for diagnosis, it exerts an effect in making possible to reduce the burden on the user. In addition, according to the present embodiment explained above, since generating the acquisition timing so as to become a timing at which it is possible to acquire diagnostic data under the same conditions on every event of acquisition of the diagnostic data, it also exerts the effect of being able to acquire data suited to obtaining knowledge from the time course of data in diagnosis.

Second Embodiment

Next, an explanation will be made for a second embodiment of the present invention by referencing FIG. 4. Herein, the second embodiment shares the basic configurations and operations with the aforementioned first embodiment; therefore, redundant explanations will be omitted hereinafter. On the other hand, since a function of acquiring sensor data measured by sensors is added in the second embodiment, explanations will be made in detail for this point.

Figure 4:
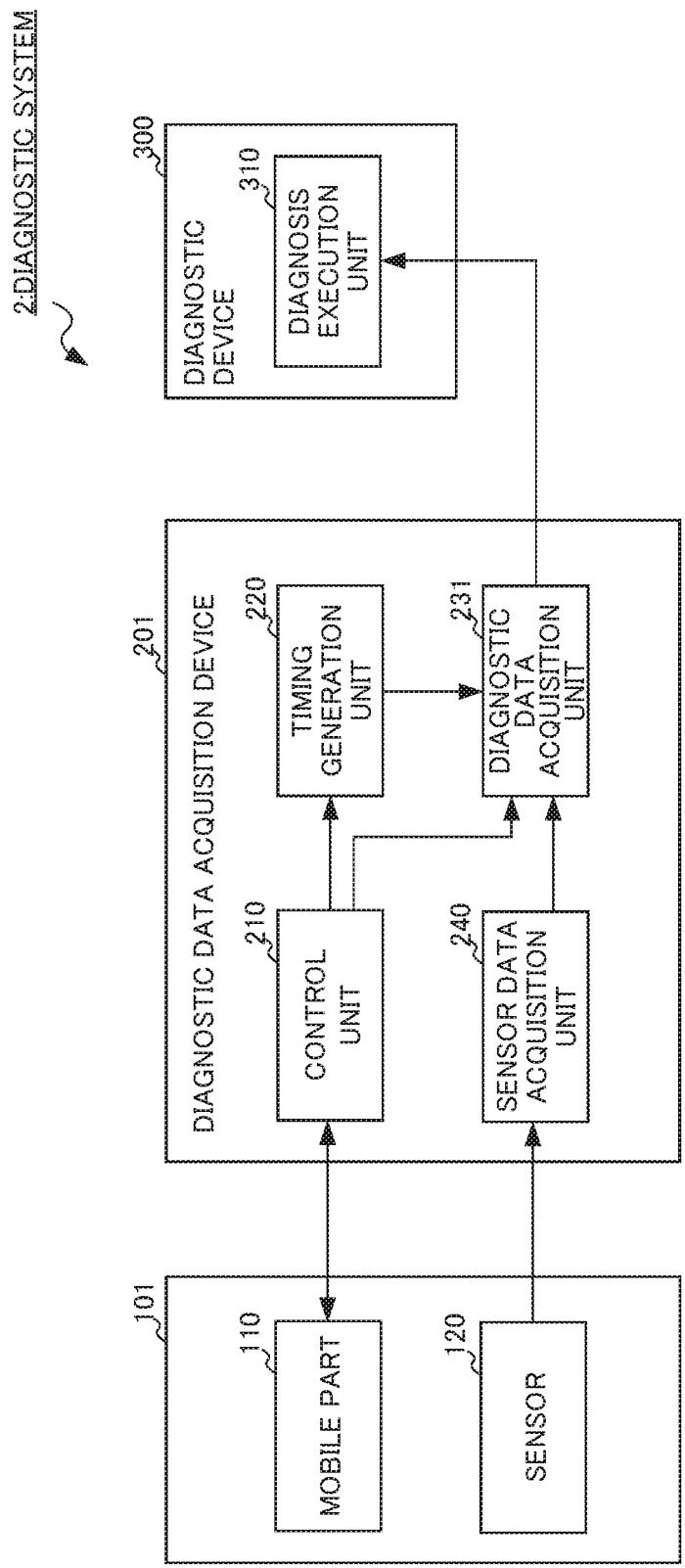
FIG. 4 is a block diagram representing a basic configuration of a second embodiment of the present invention.

As shown in FIG. 4, the diagnostic system 2 of the present embodiment includes a machine tool 101, diagnostic data acquisition device 201 and diagnostic device 300.

The machine tool 101 of the second embodiment is an equivalent device to the machine tool 100 of the first embodiment; however, it differs from the machine tool 100 of the first embodiment in the point of including sensors 120 for measuring a state related to driving of the mobile part 110 inside thereof or outside thereof (shall be included inside in the drawings).

The sensor data which is data measured by the sensor 120 is outputted to the diagnostic data acquisition device 201 for use as diagnostic data. The sensor 120 can be realized by any sensor; however, it is preferable to realize by a sensor such as an acceleration sensor, AE (Acoustic Emission) sensor, temperature sensor, amperometer or voltmeter.

The diagnostic data acquisition device 201 of the second embodiment is an equivalent device to the diagnostic data acquisition device 200 of the first embodiment; however, it differs from the diagnostic data acquisition device 200 of the first embodiment in the point of including a sensor data acquisition unit 240, which is a portion for acquiring sensor data outputted by the sensor 120 inside thereof or outside thereof (shall be included inside in the drawings). In addition, the diagnostic data acquisition device 201 differs from the diagnostic data acquisition device 200 in the point of the diagnostic data acquisition unit 230 being replaced by 231. It should be noted that, similarly to the diagnostic data acquisition device 200 of the first embodiment, it may be configured so as to realize the diagnostic data acquisition device 201 of the second embodiment by a system including a plurality of devices, and a network or the like connecting this plurality of devices (corresponding to "diagnostic data acquisition system" of the present invention).

The diagnostic data acquisition device 201 acquires the sensor data outputted by the sensor 120, and in the case of the sensor data being an analog signal, converts this analog signal into a digital signal by way of an A/D converter. Then, the diagnostic data acquisition device 201 outputs the converted digital signal to the diagnostic data acquisition unit 231 as sensor data. In addition, in the case of assuming the sensor data to be a digital signal, the diagnostic data acquisition device 201 outputs this digital signal as sensor data to the diagnostic data acquisition unit 231.

Then, the diagnostic data acquisition unit 231 not only acquires control data from the control unit 210 as diagnostic data, but also acquires sensor data outputted by the sensor data acquisition unit 240. In other words, the present embodiment also has sensor data included in the diagnostic data.

It thereby becomes possible for the diagnosis execution unit 310 to perform diagnosis using sensor data. For this reason, the present embodiment exerts an effect in that it becomes possible to raise the precision of diagnosis, and use diverse diagnostic methods using the respective sensor data.

As a specific example, it is possible to configure so as to measure vibrations which occur accompanying the driving of the mobile part 110 by the sensor 120, for example. In this case, the sensor 120 is realized by a three-axis acceleration sensor capable of measuring acceleration in the three-axial directions of the X-axis, Y-axis and Z-axis, which are respectively orthogonal to each other, and outputs an analog oscillatory waveform signal corresponding to the acceleration in each axis as sensor data.

Then, the diagnostic data acquisition unit 230 outputs the analog oscillatory waveform signal as digitized sensor data. In addition, the diagnostic data acquisition unit 231 acquires this sensor data based on the acquisition timing. Furthermore, by the diagnosis execution unit 310 performing diagnosis based on the sensor data acquired by the diagnostic data acquisition unit 231, it is possible to perform diagnosis based on the vibrations which occur accompanying driving of the mobile part 110. For example, since abnormal vibrations are generated, it is possible to diagnose as the mobile part 110 failing.

Alternatively, it is possible to configure so as to measure a temperature which varies accompanying the driving of the mobile part 110 by the sensor 120, for example. In this case, the sensor 120 is realized by a temperature sensor which measures the temperature of the spindle motor included in the mobile part 110, for example. Then, by the diagnosis execution unit 310 performing diagnosis based on the sensor data acquired by the diagnostic data acquisition unit 231, it is possible to perform diagnosis based on a temperature which varies accompanying driving of the mobile part 110. For example, due to reaching a temperature that is a permissible temperature or higher, it is possible to diagnose as the mobile part 110 overheating.

It should be noted that each device included in the above-mentioned respective embodiments can be realized by hardware, software or a combination of these. In addition, the diagnostic method that is carried out by each device included in the above-mentioned respective embodiments cooperating can be realized by hardware, software or a combination of these. Herein, being realized by software indicates the matter of being realized by a computer reading out and executing programs.

The programs can be stored using various types of non-transitory computer readable media, and supplied to a computer. The non-transitory computer readable media includes tangible storage media. Examples of non-transitory computer readable media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the programs may be supplied to a computer by way of various types of transitory computer readable media. Examples of transitory computer readable media include electrical signals, optical signals and electromagnetic waves. The transitory computer readable media can supply programs to a computer via wired communication paths such as electrical wires and optical fiber, or a wireless communication path.

In addition, the aforementioned embodiment is a preferred embodiment of the present invention; however, it is not to limit the scope of the present invention to only the above-mentioned embodiment, and implementation is possible in modes achieved by conducting various modifications in a scope not departing from the gist of the present invention. For example, implementation is possible in a form established by conducting modifications such as the following modified examples.

First Modified Example

The aforementioned respective embodiments perform diagnosis by generating an acquisition timing based on the spindle speed and spindle load, as explained by referencing FIGS. 2A and 2B. Modifying this, it may be configured so as to perform diagnosis by generating an acquisition timing based on the feed shaft speed and spindle load, for example. In other words, it may be configured so as to generate the acquisition timing so as to acquire the diagnostic data in the case of being an instant prior to the tool cutting into the work, and the feed shaft driving at a constant speed. Then, it also becomes possible to perform diagnosis for the feed shaft by setting the diagnostic data to be acquired to the load of the feed shaft, etc., for example.

Second Modified Example

The aforementioned second embodiment uses the sensor data acquired by the sensor data acquisition unit 240 as diagnostic data. Modifying this, it may be configured so as to use the sensor data acquired by the sensor data acquisition unit 240 for the generation of the acquisition timing by way of the timing generation unit 220.

For example, it may be configured so as to establish the sensor 120 as an acceleration sensor, calculate the spindle speed based on the acceleration measured by this sensor 120, and use for generation of the acquisition timing. In addition, it may be configured so as to establish the sensor 120 as a torque sensor, and use the torque of the spindle (spindle load) measured by this sensor 120 for generation of the acquisition timing.

Third Modified Example

The aforementioned respective embodiments are assumed to realize the diagnostic device 300 by way of a separate device from the diagnostic data acquisition device 200 or diagnostic data acquisition device 201; however, it may be configured so as to realize these by the same device. Alternatively, it may be configured so as to realize a part of the functions of the diagnostic data acquisition device 200 and/or diagnostic data acquisition device 201 by way of the diagnostic device 300, or it may be configured so as to realize a part of the functions of the diagnostic device 300 by way of the diagnostic data acquisition device 200 and/or diagnostic data acquisition device 201. Furthermore, for each of the diagnostic data acquisition device 200, diagnostic data acquisition device 201 and diagnostic device 300, it may be configured so as to realize not by a single device, but rather by a plurality of devices.

EXPLANATION OF REFERENCE NUMERALS 100, 101 machine tool
110 mobile part
120 sensor
200, 201 diagnostic data acquisition device (diagnostic data acquisition system)
210 control unit
220 timing generation unit
230, 231 diagnostic data acquisition unit
240 sensor data acquisition unit
300 diagnostic device
310 diagnosis execution unit

What is claimed is:

1. A diagnostic data acquisition system that acquires diagnostic data for diagnosing a machine tool, the system comprising:
    a control unit that controls, based on control data including a feedback signal acquired from the machine tool for controlling driving of a mobile part by way of feedback control, driving of the mobile part;
    a timing generation unit that generates an acquisition timing for the diagnostic data based on at least the feedback signal included in the control data; and
    a diagnostic data acquisition unit that acquires data, which varies accompanying driving of the mobile part by way of control of the control unit, based on the acquisition timing as the diagnostic data.

2. The diagnostic data acquisition system according to claim 1,
    wherein the diagnostic data acquisition unit acquires at least the predetermined feedback signal as the diagnostic data.

3. The diagnostic data acquisition system according to claim 1, further comprising:
    a measured data acquisition unit that acquires, from a measurement unit, measured data which was measured by the measurement unit that measures a state related to driving of the mobile part,
    wherein the diagnostic data acquisition unit acquires at least the measured data as the diagnostic data.

4. The diagnostic data acquisition system according to claim 3,
    wherein the timing generation unit generates the acquisition timing based also on the measured data acquired by the measured data acquisition unit, in addition to the control data.

5. The diagnostic data acquisition system according to claim 1,
    wherein the timing generation unit generates the acquisition timing, so that acquisition of the diagnostic data is started in a case of a driving speed of the mobile part becoming a constant speed, and acquisition of the diagnostic data is ended in a case of a load on the mobile part rising or declining more than a predetermined reference.

6. The diagnostic data acquisition system according to claim 5,
    wherein the timing generation unit calculates the speed of the mobile part and the load on the mobile part based on the control data.

7. A diagnostic system, comprising:
    the diagnostic data acquisition system according to claim 1; and
    a diagnostic device that diagnoses the machine tool based on the diagnostic data acquired by the diagnostic data acquisition system.

8. A diagnostic data acquisition program that causes a computer to function as a diagnostic data acquisition system, wherein the diagnostic data acquisition program causes the computer to function as the diagnostic data acquisition system according to claim 1.

* * * * *